(12) United States Patent  (10) Patent No.: US 8,885,151 B1
Chatham et al.  (45) Date of Patent: Nov. 11, 2014

(54) CONDENSING SENSOR DATA FOR TRANSMISSION AND PROCESSING

(75) Inventors: Andrew Hughes Chatham, San Francisco, CA (US); Michael Steven Montemerlo, Mountain View, CA (US); Daniel Trawick Egnor, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/602,665

(22) Filed: Sep. 4, 2012

(51) Int. Cl.
*G01S 17/89* (2006.01)

(52) U.S. Cl.
USPC .......................................................... 356/4.07

(58) Field of Classification Search
USPC .......................................................... 356/4.07
See application file for complete search history.

(56) References Cited

U.S. PATENT DOCUMENTS

| | | | |
|---|---|---|---|
| 6,792,684 B1 * | 9/2004 | Hyyppa | 33/1 A |
| 7,570,793 B2 * | 8/2009 | Lages et al. | 382/141 |
| 2004/0247157 A1 | 12/2004 | Lages et al. | |
| 2009/0310867 A1 | 12/2009 | Matei et al. | |
| 2010/0020074 A1 | 1/2010 | Taborowski et al. | |
| 2010/0030473 A1 * | 2/2010 | Au et al. | 701/301 |
| 2011/0026772 A1 | 2/2011 | Hagan et al. | |

* cited by examiner

*Primary Examiner* — Isam Alsomiri
*Assistant Examiner* — Vicente Rodriguez
(74) *Attorney, Agent, or Firm* — Lerner, David, Littenberg, Krumholz & Mentlik, LLP

(57) ABSTRACT

Aspects of the disclosure relate generally to condensing sensor data for transmission and processing. For example, laser scan data including location, elevation, and intensity information may be collected along a roadway. This data may be sectioned into quanta representing some period of time during which the laser sweeps through a portion of its field of view. The data may also be filtered spatially to remove data outside of a threshold quality area. The data within the threshold quality area for a particular quantum may be projected onto a two-dimensional grid of cells. For each cell of the two-dimensional grid, a computer evaluates the cells to determine a set of characteristics for the cell. The sets of characteristics for all of the cells of the two-dimensional grid for the particular quantum are then sent to a central computing system for further processing.

20 Claims, 14 Drawing Sheets

CONDENSING SENSOR DATA FOR TRANSMISSION AND PROCESSING

BACKGROUND

Autonomous vehicles use various computing systems to aid in the transport of passengers from one location to another. Some autonomous vehicles may require an initial input or continuous input from an operator, such as a pilot, driver, or passenger. Other autonomous systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). This detection and identification is a critical function for the safe operation of autonomous vehicle.

Autonomous vehicles may also use a detailed map of the world to determine their position. These maps are typically generated from sensor data collected in the field. Because the raw sensor data is so large it may require a significant amount of bandwidth to transmit it to a central computer system in real time. Thus, this information is typically stored after collection and subsequently uploaded to a central computer system in order to generate the detailed map. Thus, these detailed maps are generated at a later time. In some examples, this may require that the raw sensor data be processed twice; initially by the vehicle's computer and subsequently by the map generation system. As processing the raw sensor data can be expensive in terms of time and resources duplication of this processing may be especially inefficient.

BRIEF SUMMARY

One aspect of the disclosure provides a method. The method includes receiving, from a laser, laser scan data collected while a vehicle is maneuvered along a roadway. The laser scan data includes a plurality of data points. Each data point of the plurality of data points including location, elevation, and intensity information. The method includes sectioning the plurality of data points into quanta, such that each quantum of the quanta is associated with a set of the plurality of data points. Each quantum of the quanta represents a period of time during which the laser sweeps through a portion of a field of view of the laser. The method also includes, for a particular one of the quanta, filtering the associated set of data points outside of a threshold quality area; dividing the threshold quality area into a two-dimensional grid of cells; and projecting the filtered set of data points for the particular quanta onto the two-dimensional grid, such that each cell of the two-dimensional grid is associated with a subset of the filtered set of data points for the particular quanta. A processor associated with the vehicle evaluates, for each particular cell of the two-dimensional grid, the subset of the filtered set of data points for the particular quanta to determine a set of characteristics for the particular cell. The method also includes sending the sets of characteristics for all of the cells of the two-dimensional grid for the particular quantum to a central computing system.

In one example, the period of time is that which is necessary for the laser to completely sweep through the field of view. In another example, the threshold quality area represents a radial distance from the laser as the laser sweeps through the portion of the field of view of the laser. In another example, the set of characteristics for a given cell includes a minimum elevation of the subset of the filtered set of data points for the given cell. In another example, the set of characteristics for a given cell includes a maximum elevation of the subset of the filtered set of data points for the given cell. In another example, the set of characteristics for a given cell includes an average intensity of the subset of the filtered set of data points for the given cell. In another example, the set of characteristics for a given cell includes a location of the particular cell relative to a global positioning system. In another example, the set of characteristics for a given cell includes the location of the given cell relative to a previous location estimate of the vehicle. In another example, the set of characteristics for a given cell includes a location of the particular cell relative to the two-dimensional grid.

Another aspect of the disclosure provides a system. The system includes a processor associated with a particular vehicle being maneuvered along a roadway. The processor is configured to receive, from a laser, laser scan data collected while the vehicle is being maneuvered along the roadway. The laser scan data includes a plurality of data points. Each data point of the plurality of data points including location, elevation, and intensity information. The processor is configured to section the plurality of data points into quanta, such that each quantum of the quanta is associated with a set of the plurality of data points. Each quantum of the quanta represents a period of time during which the laser sweeps through a portion of a field of view of the laser. The processor is configured to, for a particular one of the quanta, filter the associated set of data points outside of a threshold quality area; divide the threshold quality area into a two-dimensional grid of cells; and project the filtered set of data points for the particular quanta onto the two-dimensional grid, such that each cell of the two-dimensional grid is associated with a subset of the filtered set of data points for the particular quanta. The processor is configured to evaluate, for each particular cell of the two-dimensional grid, the subset of the filtered set of data points for the particular quanta to determine a set of characteristics for the particular cell. The processor is also configured to send the sets of characteristics for all of the cells of the two-dimensional grid for the particular quantum to a central computing system.

In one example, the period of time is that which is necessary for the laser to completely sweep through the field of view. In another example, the threshold quality area represents a radial distance from the laser as the laser sweeps through the portion of the field of view of the laser. In another example, the set of characteristics for a given cell includes a minimum elevation of the subset of the filtered set of data points for the given cell. In another example, the set of characteristics for a given cell includes a maximum elevation of the subset of the filtered set of data points for the given cell. In another example, the set of characteristics for a given cell includes an average intensity of the subset of the filtered set of data points for the given cell. In another example, the set of characteristics for a given cell includes a location of the particular cell relative to a global positioning system.

A further aspect of the disclosure provides a non-transitory, tangible computer-readable storage medium on which computer readable instructions of a program are stored. The instructions, when executed by a processor associated with a vehicle, cause the processor to perform a method. The method includes receiving, from a laser, laser scan data collected while a vehicle is maneuvered along a roadway. The laser scan data includes a plurality of data points. Each data point of the plurality of data points including location, elevation, and intensity information. The method includes sectioning the plurality of data points into quanta, such that each quantum of the quanta is associated with a set of the plurality of data points. Each quantum of the quanta represents a period of time during which the laser sweeps through a portion of a field of view of the laser. The method also includes, for a particular one of the quanta, filtering the associated set of data points outside of a threshold quality area; dividing the threshold quality area into a two-dimensional grid of cells; and projecting the filtered set of data points for the particular quanta onto the two-dimensional grid, such that each cell of the two-dimensional grid is associated with a subset of the filtered set of data points for the particular quanta. The method also includes evaluating, for each particular cell of the two-dimensional grid, the subset of the filtered set of data points for the particular quanta to determine a set of characteristics for the particular cell. The method includes sending the sets of characteristics for all of the cells of the two-dimensional grid for the particular quantum to a central computing system.

In one example, the set of characteristics for a given cell includes a minimum elevation of the subset of the filtered set of data points for the given cell. In another example, the set of characteristics for a given cell includes a maximum elevation of the subset of the filtered set of data points for the given cell. In another example, the set of characteristics for a given cell includes an average intensity of the subset of the filtered set of data points for the given cell.

DETAILED DESCRIPTION

Aspects of the disclosure relate generally to condensing sensor data for transmission and processing. For example, in one aspect, laser scan data may be collected by a laser attached to a vehicle as the vehicle is driven along a roadway. As noted above, the laser scan data may include information such as location, elevation, and intensity information (X,Y,Z, I). The laser scan data may be sectioned or divided into quanta. A quantum of the quanta may represent a period of time that it takes the laser to sweep through some portion of the laser's field of view. The laser scan data for each particular quantum may also be filtered to remove, ignore, or eliminate data points outside of a threshold area.

The threshold area may be divided or sectioned into a 2D grid. The filtered laser data points of the particular quantum may then be projected onto the 2D grid. A computer may evaluate each cell of the grid to determine the maximum elevation, minimum elevation, average intensity, and location of the cell. This determined cell data for the particular quantum (the maximum elevation, minimum elevation, average intensity, and location of the cell) may then be transmitted to another computer for further processing. The computer may then continue to filter, project, evaluate, and transmit the cell data for each subsequent quantum of the quanta. As noted in more detail below, the condensed data requires significantly less bandwidth than required if transmitting all of the laser scan data collected. This allows the laser data to be sent to a central computer for processing almost immediately after the data is collected.

Figure 1:
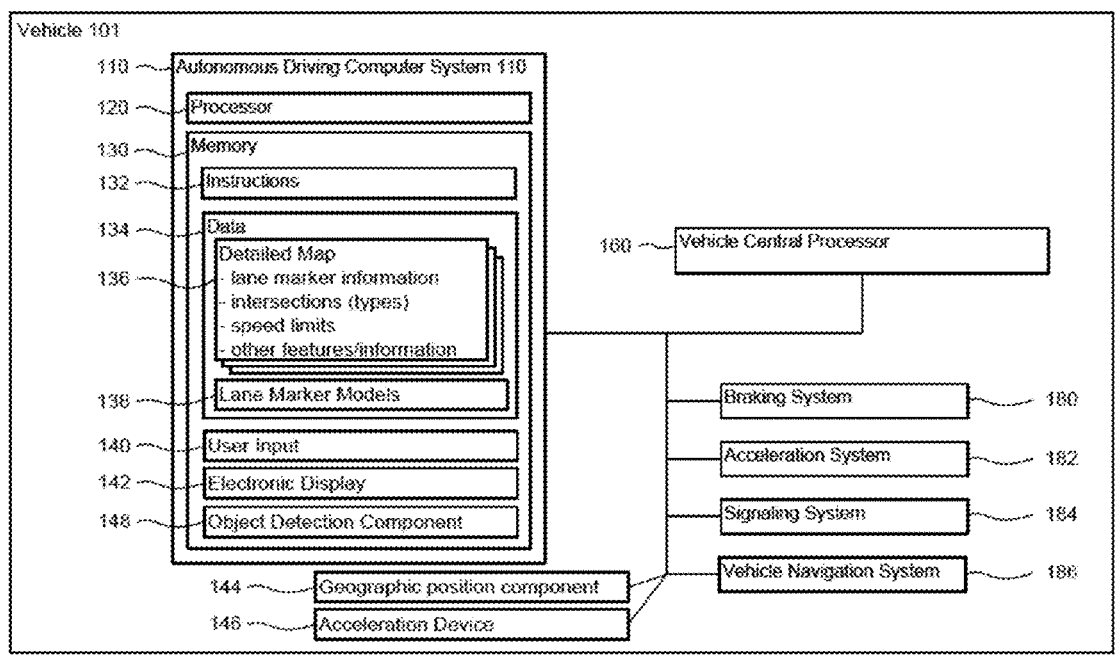
FIG. 1 is a functional diagram of a system in accordance with aspects of the disclosure.

As shown in FIG. 1, an autonomous driving system 100 in accordance with one aspect of the disclosure includes a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC. Although FIG. 1 functionally illustrates the processor, memory, and other elements of computer 110 as being within the same block, it will be understood that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein some of the components, such as steering components and deceleration components, may each have their own processor that only performs calculations related to the component's specific function.

In various aspects described herein, the processor may be located remotely from the vehicle and communicate with the vehicle wirelessly. In other aspects, some of the processes described herein are executed on a processor disposed within the vehicle while others are executed by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g., a video camera) for gathering the explicit (e.g., a gesture) or implicit (e.g., "the person is asleep") information about the states and desires of a person.

Figure 2:
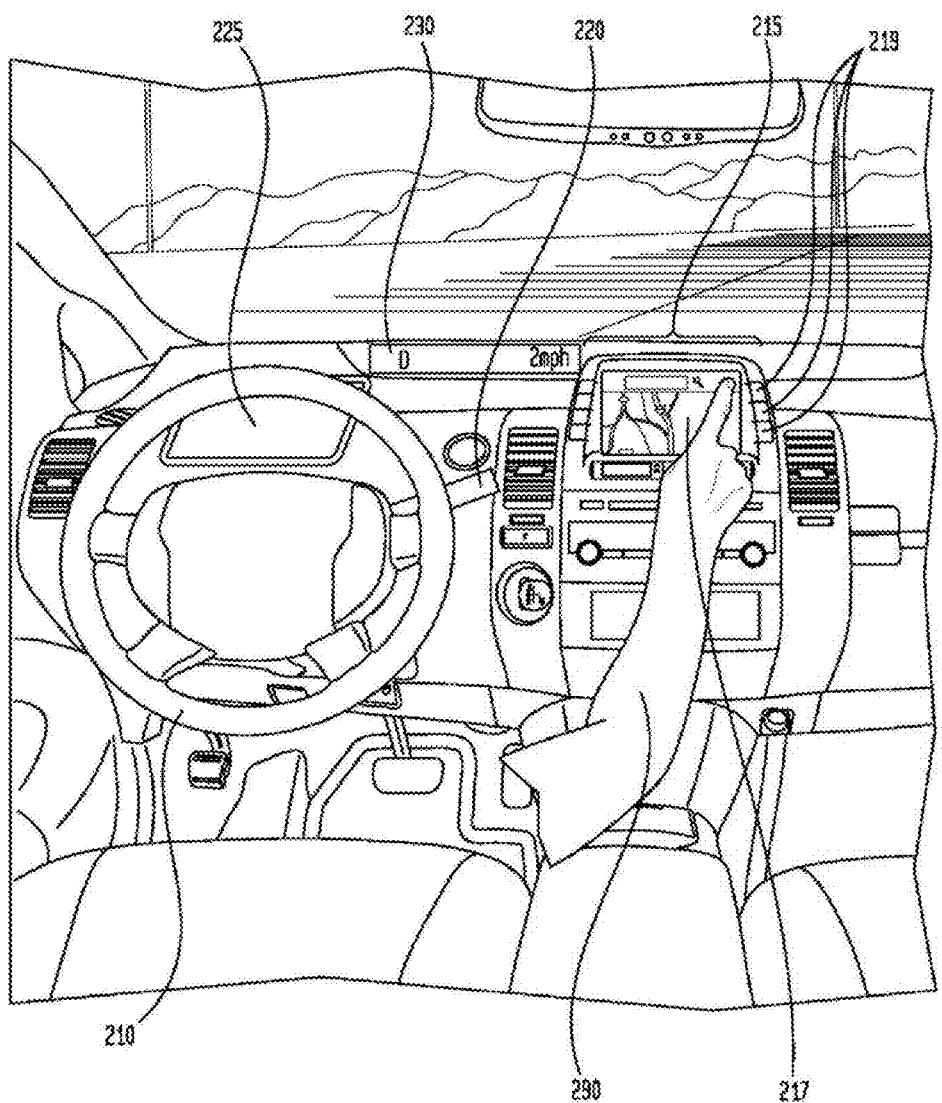
FIG. 2 is an interior of an autonomous vehicle in accordance with aspects of the disclosure.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 110.

Vehicle 101 may also include one or more additional displays. For example, the vehicle may include a display 225 for displaying information regarding the status of the autonomous vehicle or its computer. In another example, the vehicle may include a status indicating apparatus, such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, such as steering wheel 210, or provide various other types of indications.

The autonomous driving computing system may capable of communicating with various components of the vehicle. For example, returning to FIG. 1, computer 110 may be in communication with the vehicle's conventional central processor 160 and may send and receive information from the various systems of vehicle 101, for example the braking 180, acceleration 182, signaling 184, and navigation 186 systems in order to control the movement, speed, etc., of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other features in communication with computer 110, such as an accelerometer, gyroscope or another direction/speed detection device 146 to determine the direction and speed of the vehicle or changes thereto. By way of example only, device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

The vehicle may also include components for detecting objects external to the vehicle such as other vehicles, obstacles in the roadway, traffic signals, signs, trees, etc. The detection system may include lasers, sonar, radar, cameras or any other detection devices which record data which may be processed by computer 110. For example, if the vehicle is a small passenger vehicle, the car may include a laser mounted on the roof or other convenient location.

Figure 3A:
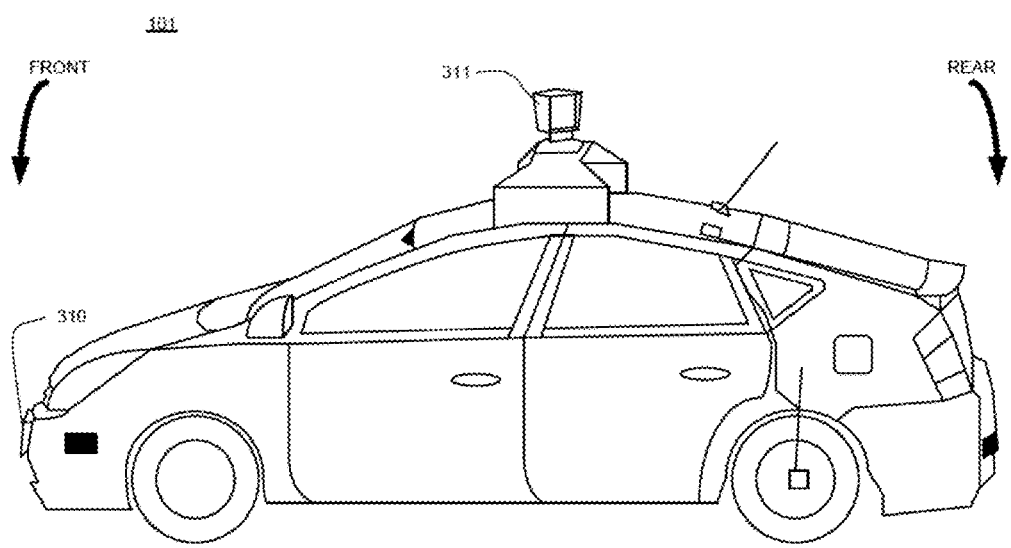
FIG. 3A is an exterior of an autonomous vehicle in accordance with aspects of the disclosure.

As shown in FIG. 3A, vehicle 101 may comprise a small passenger vehicle. In this example, vehicle 101 sensors may include lasers 310 and 311, mounted on the front and top of the vehicle, respectively. The lasers may include commercially available lasers such as the Velodyne HDL-64 or other models. The lasers may include more than one laser beam; for example, a Velodyne HDL-64 laser may include 64 beams. In one example, the beams of laser 310 may have a range of 150 meters, a thirty degree vertical field of view, and a thirty degree horizontal field of view. The beams of laser 311 may have a range of 50-80 meters, a thirty degree vertical field of view, and a 360 degree horizontal field of view. It will be understood that other lasers having different ranges and configurations may also be used. The lasers may provide the vehicle with range and intensity information which the computer may use to identify the location and distance of various objects in the vehicles surroundings. In one aspect, the laser may measure the distance between the vehicle and the object surfaces facing the vehicle by spinning on its axis and changing its pitch.

The aforementioned sensors may allow the vehicle to understand and potentially respond to its environment in order to maximize safety for passengers as well as objects or people in the environment. It will be understood that the vehicle types, number and type of sensors, the sensor locations, the sensor fields of view, and the sensors' sensor fields are merely exemplary. Various other configurations may also be utilized.

In addition to the sensors described above, the computer may also use input from sensors typical non-autonomous vehicles. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, intersections, crosswalks, speed limits, traffic signals, buildings, signs, real time traffic information, or other such objects and information.

The detailed map information 136 may also include lane marker information identifying the location, elevation, and shape of lane markers. The lane markers may include features such as solid or broken double or single lane lines, solid or broken lane lines, reflectors, etc. A given lane may be associated with left and right lane lines or other lane markers that define the boundary of the lane.

Figure 4:
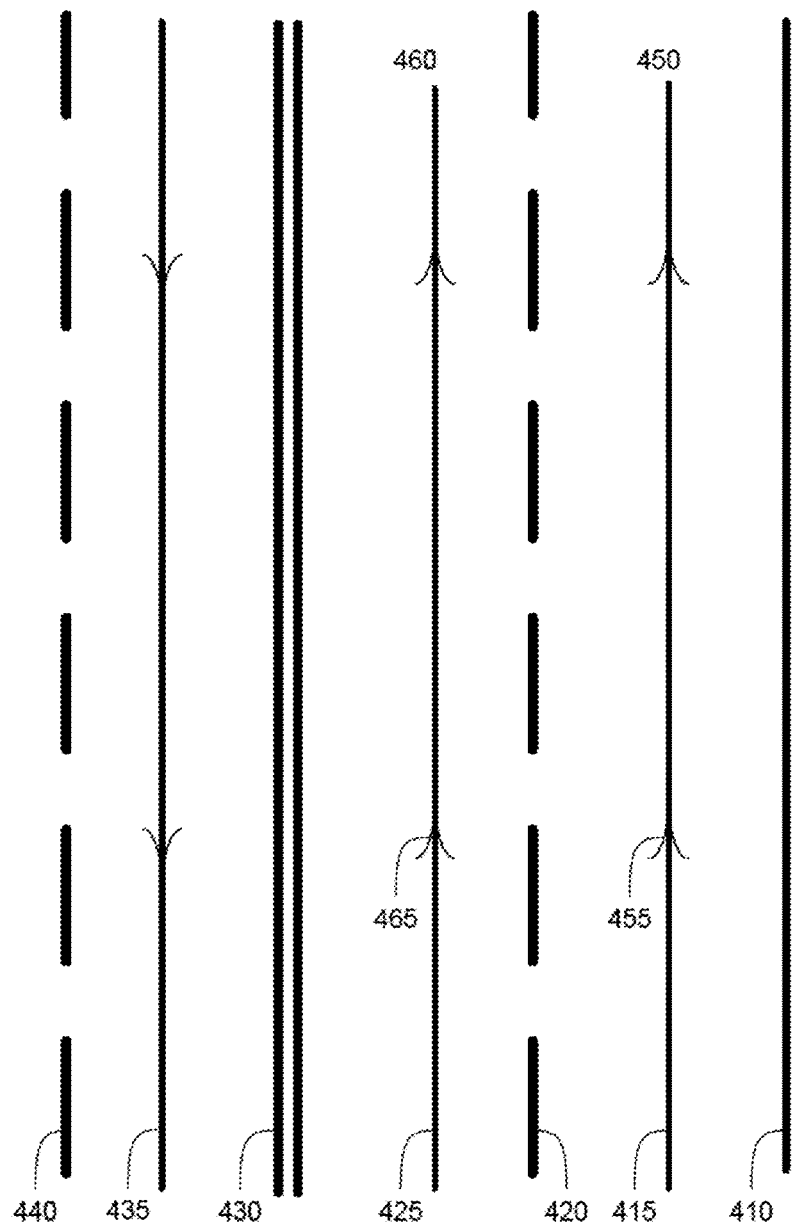
FIG. 4 is a diagram of map information in accordance with aspects of the disclosure.

FIG. 4 depicts a detailed map 400 including the same example section of roadway (as well as information outside of the range of the laser). The detailed map of the section of roadway includes information such as solid lane line 410, broken lane lines 420, 440, and double solid lane lines 430. These lane lines define lanes 450 and 460. Each lane is associated with a rail 455, 465 which indicates the direction in which a vehicle should generally travel in the respective lane. For example, a vehicle may follow rail 465 when driving along lane 460.

Again, although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 3B:
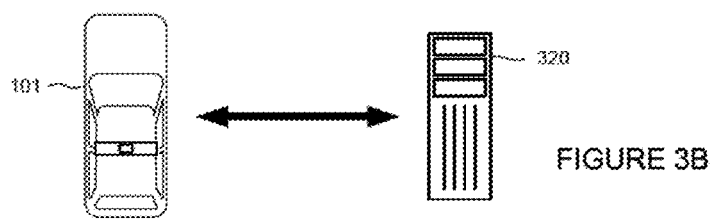
FIG. 3B is a pictorial diagram of a system in accordance with aspects of the disclosure.
Figure 3C:
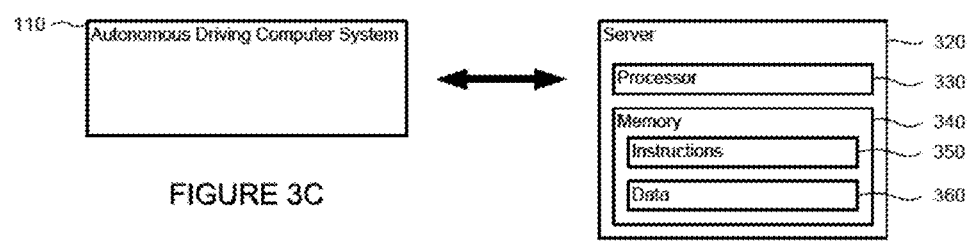
FIG. 3C is a functional diagram of a system in accordance with aspects of the disclosure.

Computer 110 may also receive or transfer information to and from other computers. For example, the map information stored by computer 110 may be received or transferred from other computers and/or the sensor data collected from the sensors of vehicle 101 may be transferred to another computer for processing as described herein. As shown in FIGS. 3B and 3C, data from computer 110 may be transmitted via a network to computer 320 for further processing. The network, and intervening nodes, may comprise various configurations and protocols including cellular networks, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces. In another example, data may be transferred by storing it on memory which may be accessed by or connected to computers 110 and 320.

In one example, computer 320 may comprise a server having a plurality of computers, e.g., a load balanced server farm, that exchange information with different nodes of a network for the purpose of receiving, processing and transmitting the data from computer 110. The server may be configured similarly to the computer 110, with a processor 330, memory 350, instructions 360, and data 370.

Returning to FIG. 1, data 134 may also include laser scan data and laser quantum information. As described in more detail below, the laser scan data may include data generated by a laser, such as lasers 310 and/or 311. The laser quantum information may include laser scan data that has been filtered and evaluated by computer 110 in order to reduce the amount of data transmitted by computer 110 to computer 320.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5:
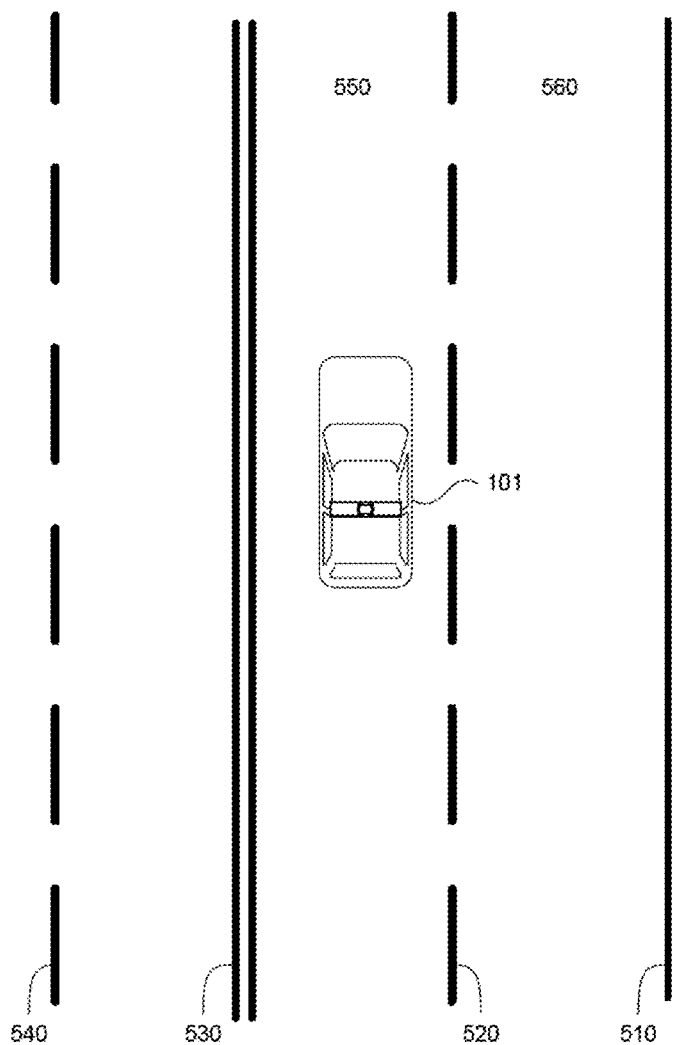
FIG. 5 is a diagram of laser scan data in accordance with aspects of the disclosure.

A vehicle including one or more lasers may be driven along a roadway. For example, the laser may be an off board sensor attached to a typical vehicle or a part of an autonomous driving system, such as vehicle 101. FIG. 5 depicts vehicle 101 on a section of the roadway 500 corresponding to the detailed map information of FIG. 4. In this example, the roadway includes solid lane line 510, broken lane lines 520 and 540, double lane lines 530, and lanes 550 and 560.

As the vehicle's laser or lasers are moved along, the laser may collect laser scan data. The laser scan data may include data points having range and intensity information for the same location (point or area) from several directions and/or at different times. For example, the intensity information (I) may indicate the reflectivity of the object from which the light was received by the laser. The range and location information may be processed by computer 110 to determine location and elevation for each data point: (X,Y,Z).

Before or in conjunction with this processing, the laser data may initially be broken into small slices of time. These slices of time, as used herein, may be referred to as quanta. Each quantum may represent a change in time as the laser sweeps through some portion of its field of view. In one example, if the laser has a 360 degree field of view and is able to make a full 360 degree sweep in 0.1 seconds, the quanta may last 0.1 seconds. However, longer or shorter quanta (0.2 seconds, 0.05 seconds, etc.) may also be used.

Figure 6:
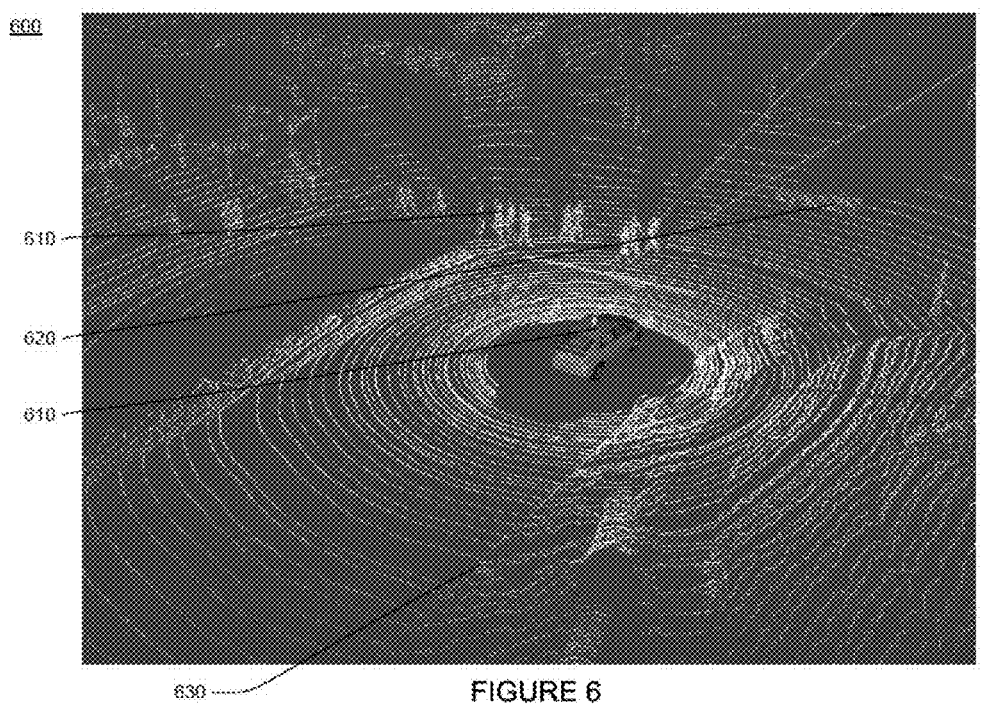
FIG. 6 is an example of laser scan data depicting a vehicle on a roadway in accordance with aspects of the disclosure.

FIG. 6 depicts an image 600 of vehicle 101 approaching an intersection. The image was generated from laser scan data collected by the vehicle's lasers for a single 360 degree scan of the vehicle's surroundings, for example, using the data points of all of the beams of the collecting laser(s). In this regard, if a quantum time is 0.1 seconds and the laser captures 360 degrees of data points, image 600 may represent the data from a single quantum. In this example, the white lines represent how the laser "sees" its surroundings. When the data points are considered together, the data points may indicate the shape and three-dimensional (3D) location (X,Y,Z) of other features and objects in the vehicle's surroundings. For example, the laser scan data may indicate the outline, shape and distance from vehicle 101 of various objects such as people 610, vehicles 620, and curb 630.

Figure 7:
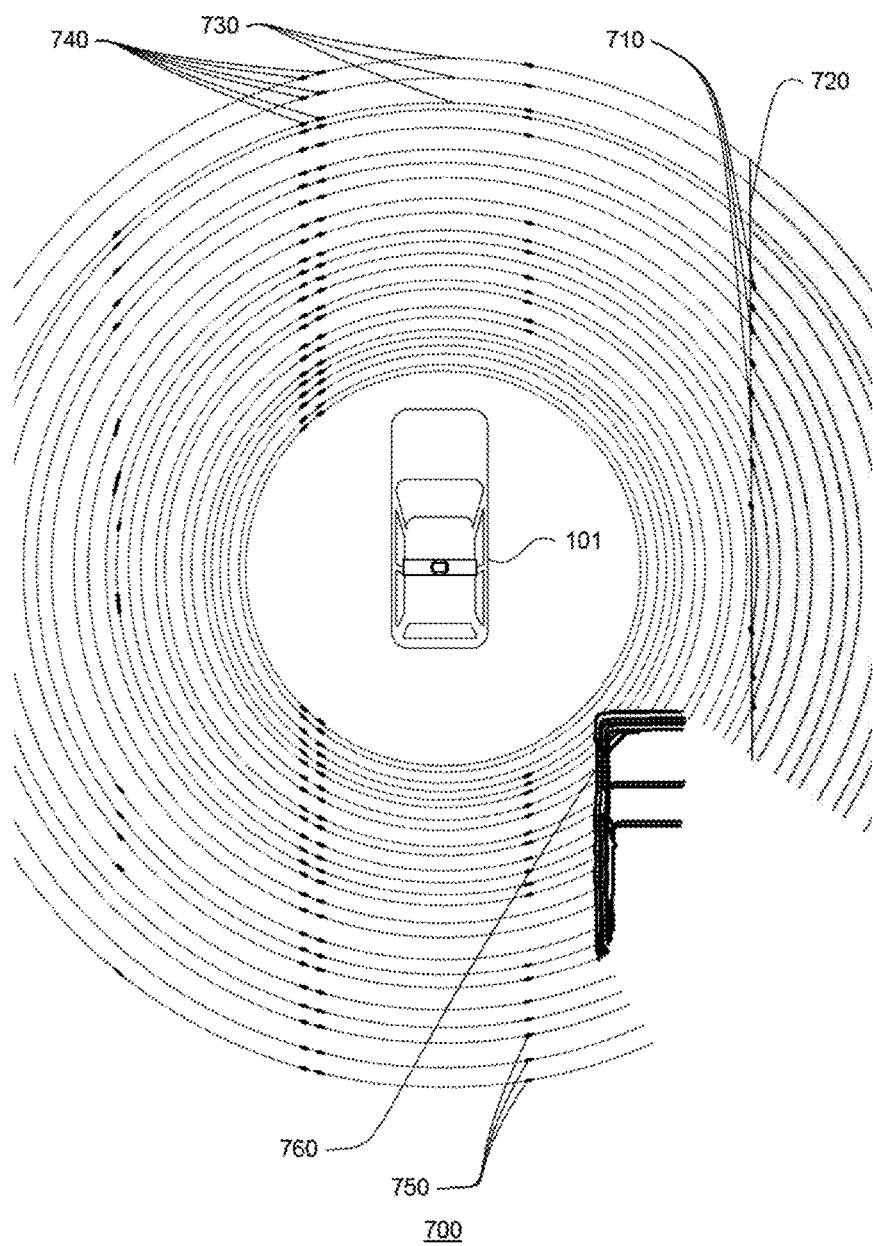
FIG. 7 is another diagram of laser scan data in accordance with aspects of the disclosure.

FIG. 7 depicts another example 700 of laser scan data collected for a single quantum while a vehicle is driven along roadway 500 of FIG. 5 (and also that depicted in map information 400 of FIG. 4). In the example of FIG. 7, vehicle 101 is depicted surrounded by laser lines 730 indicating the area around the vehicle scanned by the laser. Each laser line may represent a series of discrete data points from a single beam. Data points from more highly reflective features such as lane lines, white paint, reflectors, or those with retroreflective properties may have a greater intensity than less reflective features. In this example, reference line 720 connects the data points 710 associated with a solid lane line and is not part of the laser data.

FIG. 7 also includes data points 740 generated from light reflecting off of the double lane lines 530 (shown in FIG. 5) as well as distance and data points 750 generated form light reflecting off of the broken lane line 520 (shown in FIG. 5). In addition to features of the roadway 500, the laser scan data of FIG. 7 may include data from other objects such as 760 generated from another object in the roadway, such as a vehicle.

Figure 8:
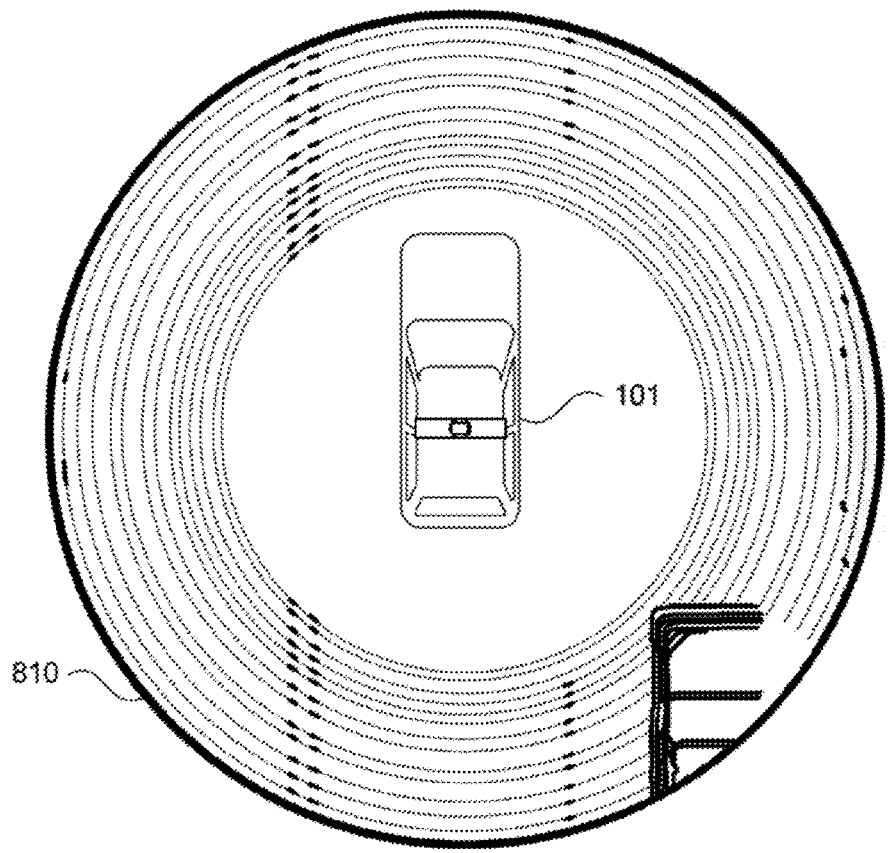
FIG. 8 is yet another diagram of laser scan data in accordance with aspects of the disclosure.

In addition to limiting a quantum of laser data in time, the quanta may also be limited in space. As the accuracy of this data drops off the farther from the laser, much of the data past some threshold quality area may be less useful. Accordingly, data outside of the threshold quality area may be excluded by computer 110 in order to reduce the processing resources required. In one example, the laser may have a 360 degree field of view for over 100 meters. In this example, a threshold area of 25 meters in diameter from the laser itself may be used. Data within this 25 meter diameter may be assumed to be of a higher quality than that which would be outside of this threshold area. FIG. 8 is an example 800 of the laser data of FIG. 7 within a threshold area represented by ring 810. The data points beyond ring 810 (not shown) have been excluded.

Figure 9:
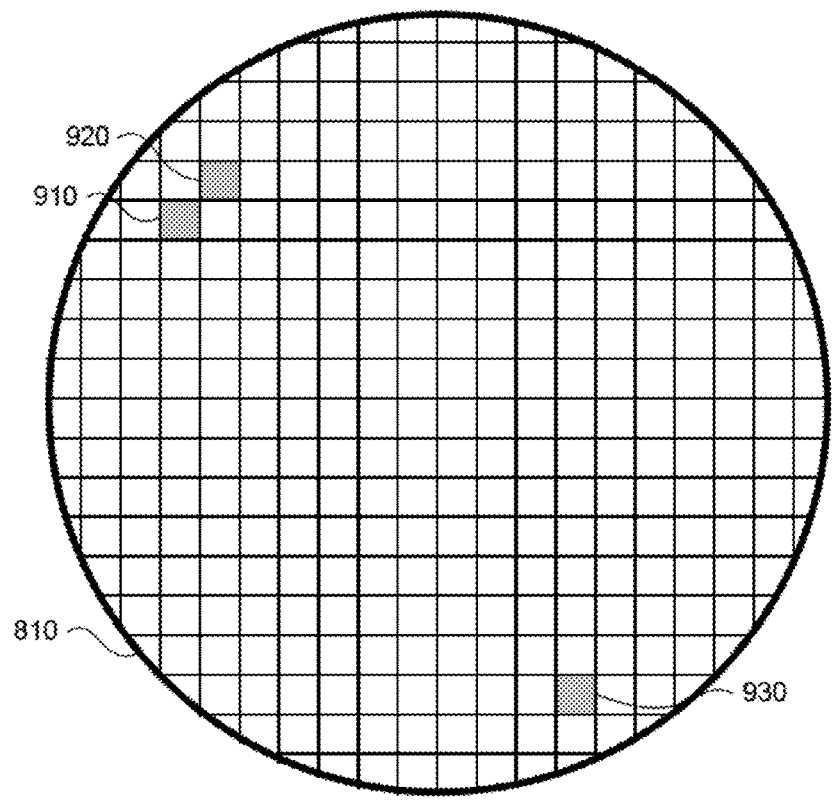
FIG. 9 is a diagram of a two-dimensional grid in accordance with aspects of the disclosure.

Computer 110 may divide the threshold quality area into a two-dimensional (2D) grid. The granularity of the grid may be set or selected depending upon that needed for post processing purposes. For example, if the quantum is to be used for map generation, the grid should be at least as fine-grained as the desired map. In this regard, 5 by 5 cm cells may be appropriate, though other cell sizes and configurations may also be used. FIG. 9 depicts an example 900 of ring 810 divided into a grid having a plurality of cells, such as cells 910, 920, 930 (highlighted for clarity). These cells are representative and not to scale. In addition, cells may be significantly larger or smaller than those depicted in FIG. 9.

Figure 10:
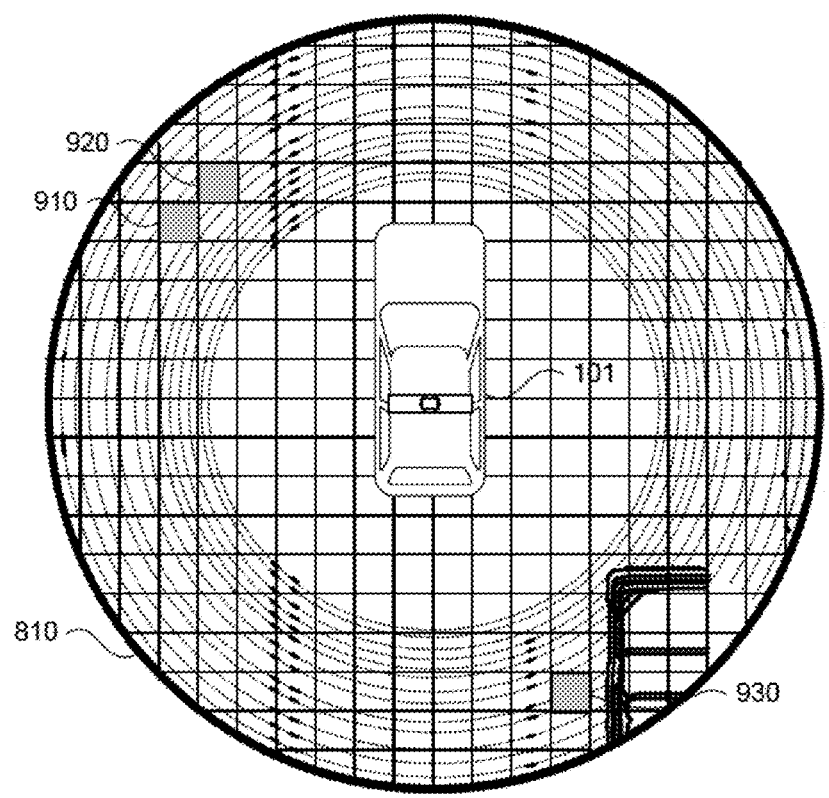
FIG. 10 a further diagram of laser scan data in accordance with aspects of the disclosure.

Computer 110 may project the data points for the quantum onto the grid. Thus, each cell of the grid may be associated with a subset of data points for the quantum. The number of data points in the set will therefore depend directly upon the number of data points produced by the laser as it sweeps through the laser's field of view, the length of time of the quantum, as well as the dimensions of the cells. FIG. 10 depicts an example 1000 of the laser data of FIG. 8 in ring 810 projected onto the grid of FIG. 9. Once again, cells 910, 920, 930 of the grid are shown as highlighted for clarity.

Each cell of the grid may then be evaluated by the computer 110 to determine a set of characteristics for that cell. For example, the computer 110 may determine the minimum elevation ($Z_{min}$), the maximum elevation ($Z_{max}$), and the average intensity (I) of the data points of the cells. Thus, the data associated with a particular cell may be reduced from a relatively large number of data points to a set of only a few relevant parameters for that cell.

Figure 11:
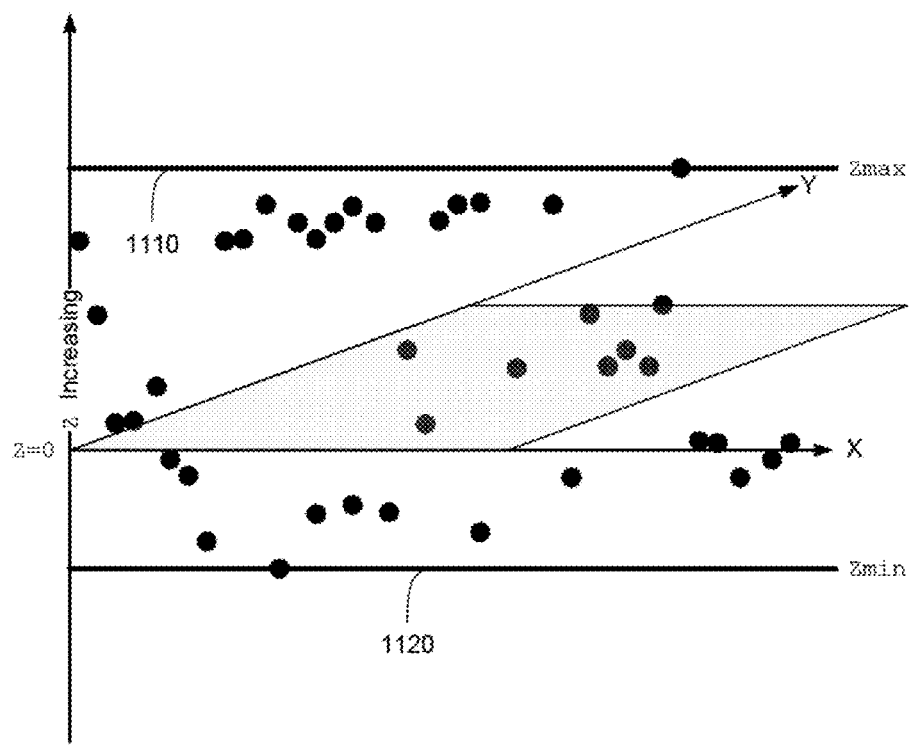
FIG. 11 is a diagram of laser scan data for a particular cell in accordance with aspects of the disclosure.

FIG. 11 depicts an example 1100 of a single cell and the laser data points, including location and elevation, associated with that cell. In this example, cell 910 is shown with the laser data points, including location and elevation (X,Y,Z), projected onto cell 920 as shown in FIG. 10 (FIG. 10 includes the grid as well as the laser scan data from FIG. 8). FIG. 11 also includes lines 1110 representing the maximum elevation (Zmax) and minimum elevation (Zmin) for the laser data points of cell 910 as determined by computer 110.

Figure 12:
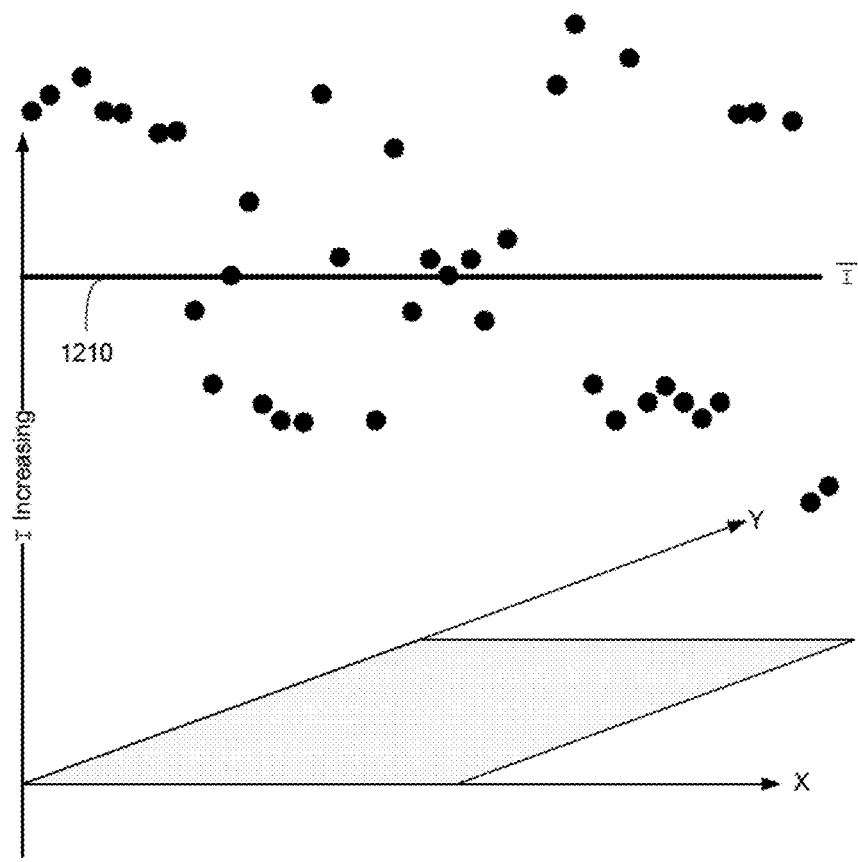
FIG. 12 is a diagram of laser scan data for a particular cell in accordance with aspects of the disclosure.

FIG. 12 depicts an example 1200 of a single cell and the laser data points associated with that cell. In this example, cell 910 is shown with the laser data points, including location and intensity (X,Y,I), projected onto cell 920 as shown in FIG. 10. FIG. 12 also includes line 1210, which represents the average intensity for the laser data points of cell 910 as determined by computer 110.

In addition to the characteristics described above, computer 110 may generate or determine location information for each cell. For example, initially, the location information provided by the laser may be referenced to a coordinate system that is relative to the laser itself. The computer may convert these coordinates to GPS readings and/or relative position estimates. In one example, the relative position estimate may be extrapolated, for example by applying speed and heading information to a previous location estimate. In some examples, the location information may also include the vehicle's attempts to localize itself relative to an existing map such as the detailed map information described above.

Rather than using GPS latitude and longitude coordinates, computer 110 may identify location information that is relative to the grid itself. Thus, detailed GPS latitude and longitude coordinate information may be translated to small integers which are easier to compress. These integers may also require less resources as they take up significantly less storage space (and also bandwidth during transmission) than latitude and longitude data. In addition, knowing the actual or estimated latitude and longitude and size (which may be fixed) of the grid would allow for the same level of precision as the latitude and longitude coordinate data, again with significantly less resource requirements.

In another example, the grid may be determined by determining the GPS latitude and longitude coordinates from the raw laser data rather than a fixed grid size. In this example, teach point may be stored at the integer coordinates corresponding to latitude and longitude. Thus, a given (x, y) location may be described as: (latitude*10^6, longitude*10^6).

Thus, after this processing each cell of a quantum may be associated with a set of characteristics such as location, maximum elevation, minimum elevation, and average intensity (X, Y, $Z_{max}$, $Z_{min}$, I). The set of characteristics for each cell of an entire quantum may then be transmitted to a central computing system such as computer 320 for further processing. As noted above, this set of characteristics, and not the actual data points themselves, may be sent wirelessly in various ways including, for example, using a cellular modem.

Figure 13:
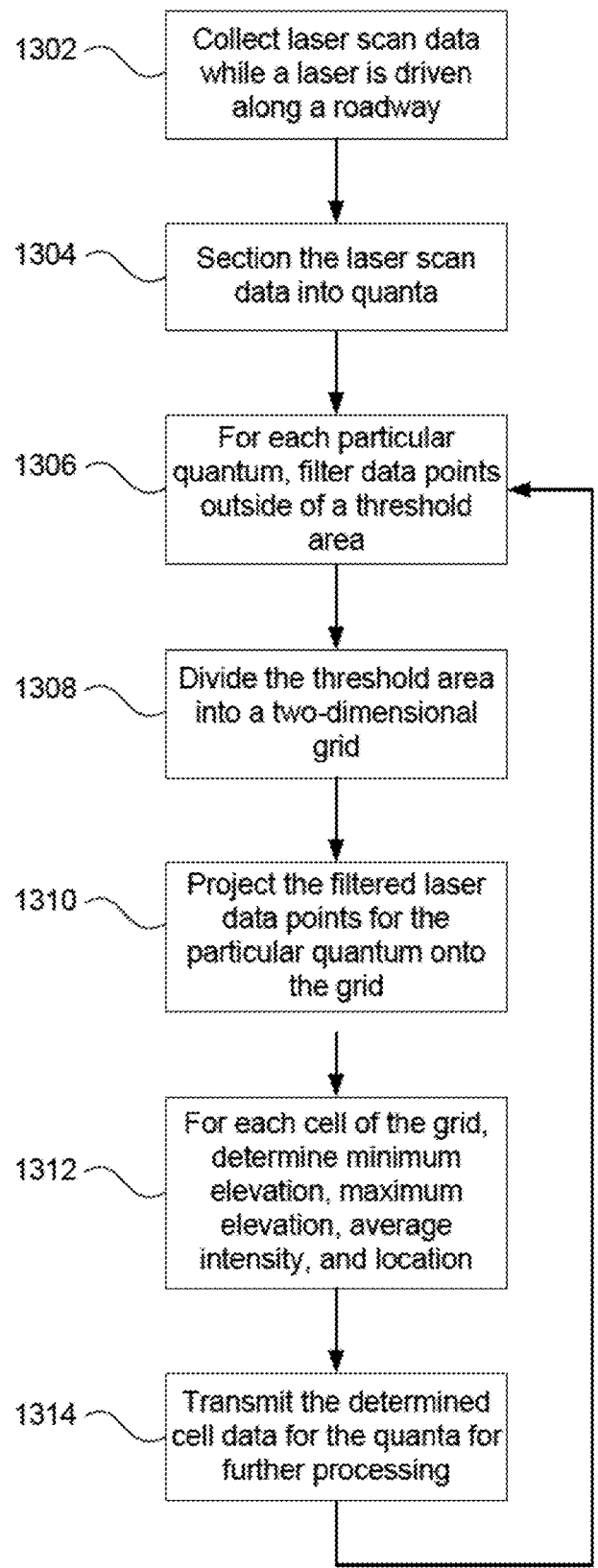
FIG. 13 is a flow diagram in accordance with aspects of the disclosure.

FIG. 13 is an example of a flow diagram 1300 of some of the aspects described above performed by computer 110. In this example, laser scan data is collected as the laser attached to a vehicle, such as vehicle 101, is driven along a roadway at block 1302. As noted above, the laser scan data may include information such as location, elevation, and intensity information (X,Y,Z,I). The laser scan data is sectioned or divided into quanta at block 1304. A quantum of the quanta may represent a period of time that it takes the laser to sweep through some portion of the laser's field of view. The laser scan data for each particular quantum is filtered to remove, ignore, or eliminate data points outside of a threshold area at block 1306.

The threshold area is divided or sectioned into a 2D grid at block 1308. The filtered laser data points of the particular quantum are then projected onto the 2D grid at block 1310. Computer 110 then evaluates each cell of the grid to determine the maximum elevation, minimum elevation, average intensity, and location of the cell at block 1312. This determined cell data for the particular quantum (the maximum elevation, minimum elevation, average intensity, and location of the cell) is then transmitted to another computer, such as computer 320, for further processing at block 1314. Computer 110 then returns to block 1316 to filter, project, evaluate, and transmit the cell data for the next quantum.

Accordingly, the raw sensor data may be processed only a single time, rather than by both computer 101 and subsequently by computer 320. In addition, by using the quanta (and, in some examples the spatial threshold quality area limit as well), the amount of data that is processed by computer 110 may be dramatically reduced. As the coordinates may be stored as small integer values, this may take up even less storage and bandwidth and may also compress better than the actual coordinates. Yet further, by sending only a few pieces of data for each cell, sending the processed quantum data, the total amount of data being processed and subsequently transmitted may be significantly reduced without sacrificing quality or usefulness.

The quanta and associated cell data may then be stored, managed, and/or post-processed by computer 320 for various purposes. For example, the quanta may be used to generate a map, look at a view of the world without actually building a globally positioned map (see, for example, FIG. 6), and/or determine the position of lane markers or other static objects, etc.

For example, if quanta are to be used for map generation, the location information associated with the cells of each quantum may be shifted using SLAM (simultaneous localization and mapping) techniques, so that each quantum is positioned correctly. In this regard, because the amount of data points for each quanta has been dramatically reduced, entire quanta may be shifted, adjusted, or moved around rather than instantaneous pieces of data allowing for faster and more streamlined treatment during the post-processing.

In some examples, these corrected positions may be stored in a database or other storage arrangement. The cell data may then be projected to this corrected position and combined into a globally consistent map. Different quanta may also be matched together by analyzing combinations of contiguous quanta or, if available, by using localization information computed by computer 110.

Alternatively, this post-processing may be performed by computer 110. In this example, computer 110 may send computer 320 even further refined information, such as a fully positioned processed quanta or a complete map.

In yet another alternative, rather than processing the quanta at the vehicle by computer 110, all of the laser data may be sent to computer 320 for both the initial quanta processing as well as the post-processing. However, given current technology, this alternative may actually be very slow, though this may change as transmission speeds increase and hardware devices are further refined.

In the examples described above, computer 110 continuously transmits the cell data for each quanta to computer 320 as the vehicle is driven along regardless of the actual location of vehicle 101. However, in some examples, vehicle 101 may be routed to certain specific areas for which the roadgraph or detailed map information is not available, incomplete, or out of date. In yet another example, computer 110 may generate and transmit the quanta and associated cell data only where computer 110 detects or determines an inconsistency in the roadgraph or detailed map information.

In yet another example, the processing, features and aspects described herein may be used with other types of sensor data. For example, similar quanta and data processing may be used with camera images projected as rays onto a ground plane using the orientation of the camera and some estimation of the ground (using a map or assuming the world is flat). The location of where each colored image pixel hits the ground may be treated as the laser data points described above by being projected onto a grid, etc. However, rather than having intensity or elevation information, each grid cell may be associated with color information from the pixels projected within that cell. The location information for the grid cells (for example, determined as described above) along with the color information may be transmitted to another computer, such as computer 320, for further processing.

As these and other variations and combinations of the features discussed above can be utilized without departing from the subject matter as defined by the claims, the foregoing description of exemplary implementations should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
receiving, from a laser, laser scan data collected while a vehicle is maneuvered along a roadway, the laser scan data including a plurality of data points, each data point of the plurality of data points including location, elevation, and intensity information;
sectioning the plurality of data points into quanta, such that each quantum of the quanta is associated with a set of the plurality of data points, where each quantum of the quanta represents a period of time during which the laser completely sweeps through a field of view of the laser;

for a particular one of the quanta, filtering the associated set of data points outside of a threshold quality area;

dividing the threshold quality area into a two-dimensional grid of cells;

projecting the filtered set of data points for the particular quanta onto the two-dimensional grid, such that each cell of the two-dimensional grid is associated with a subset of the filtered set of data points for the particular quanta;

for each particular cell of the two-dimensional grid, evaluating, by a processor associated with the vehicle, the subset of the filtered set of data points for the particular quanta to determine a set of characteristics for the particular cell; and sending the sets of characteristics for all of the cells of the two-dimensional grid for the particular quantum to a central computing system.

2. The method of claim 1, wherein the threshold quality area represents a radial distance from the laser as the laser sweeps through the portion of the field of view of the laser.

3. The method of claim 1, wherein the set of characteristics for a given cell includes a minimum elevation of the subset of the filtered set of data points for the given cell.

4. The method of claim 1, wherein the set of characteristics for a given cell includes a maximum elevation of the subset of the filtered set of data points for the given cell.

5. The method of claim 1, wherein the set of characteristics for a given cell includes an average intensity of the subset of the filtered set of data points for the given cell.

6. The method of claim 1, wherein the set of characteristics for a given cell includes a location of the particular cell relative to a global positioning system.

7. The method of claim 1, wherein the set of characteristics for a given cell includes the location of the given cell relative to a previous location estimate of the vehicle.

8. The method of claim 1, wherein the set of characteristics for a given cell includes a location of the particular cell relative to the two-dimensional grid.

9. A system comprising:

a processor associated with a particular vehicle being maneuvered along a roadway, the processor being configured to:

receive, from a laser, laser scan data collected while the vehicle is being maneuvered along the roadway, the laser scan data including a plurality of data points, each data point of the plurality of data points including location, elevation, and intensity information;

section the plurality of data points into quanta, such that each quantum of the quanta is associated with a set of the plurality of data points, where each quantum of the quanta represents a period of time during which the laser completely sweeps through a field of view of the laser;

for a particular one of the quanta, filter the associated set of data points outside of a threshold quality area;

divide the threshold quality area into a two-dimensional grid of cells;

project the filtered set of data points for the particular quanta onto the two-dimensional grid, such that each cell of the two-dimensional grid is associated with a subset of the filtered set of data points for the particular quanta;

for each particular cell of the two-dimensional grid, evaluate the subset of the filtered set of data points for the particular quanta to determine a set of characteristics for the particular cell; and send the sets of characteristics for all of the cells of the two-dimensional grid for the particular quantum to a central computing system.

10. The system of claim 9, wherein the threshold quality area represents a radial distance from the laser as the laser sweeps through the portion of the field of view of the laser.

11. The system of claim 9, wherein the set of characteristics for a given cell includes a minimum elevation of the subset of the filtered set of data points for the given cell.

12. The system of claim 9, wherein the set of characteristics for a given cell includes a maximum elevation of the subset of the filtered set of data points for the given cell.

13. The system of claim 9, wherein the set of characteristics for a given cell includes an average intensity of the subset of the filtered set of data points for the given cell.

14. The system of claim 9, wherein the set of characteristics for a given cell includes a location of the particular cell relative to a global positioning system.

15. A non-transitory, tangible computer-readable storage medium on which computer readable instructions of a program are stored, the instructions, when executed by a processor associated with a vehicle, cause the processor to perform a method, the method comprising:

receiving, from a laser, laser scan data collected while a vehicle is maneuvered along a roadway, the laser scan data including a plurality of data points, each data point of the plurality of data points including location, elevation, and intensity information;

sectioning the plurality of data points into quanta, such that each quantum of the quanta is associated with a set of the plurality of data points, where each quantum of the quanta represents a period of time during which the laser completely sweeps through a field of view of the laser;

for a particular one of the quanta, filter the associated set of data points outside of a threshold quality area;

dividing the threshold quality area into a two-dimensional grid of cells;

projecting the filtered set of data points for the particular quanta onto the two-dimensional grid, such that each cell of the two-dimensional grid is associated with a subset of the filtered set of data points for the particular quanta;

for each particular cell of the two-dimensional grid, evaluating the subset of the filtered set of data points for the particular quanta to determine a set of characteristics for the particular cell; and sending the sets of characteristics for all of the cells of the two-dimensional grid for the particular quantum to a central computing system.

16. The medium of claim 15, wherein the set of characteristics for a given cell includes a minimum elevation of the subset of the filtered set of data points for the given cell.

17. The medium of claim 15, wherein the set of characteristics for a given cell includes a maximum elevation of the subset of the filtered set of data points for the given cell.

18. The medium of claim 15, wherein the set of characteristics for a given cell includes an average intensity of the subset of the filtered set of data points for the given cell.

19. The method of claim 1, wherein a number of the filtered set of data points projected onto the grid depends on an amount of the plurality of data points.

20. The method of claim 1, wherein a number of the filtered set of data points projected onto the grid depends on a length of time of the quantum.

* * * * *